2,058,176

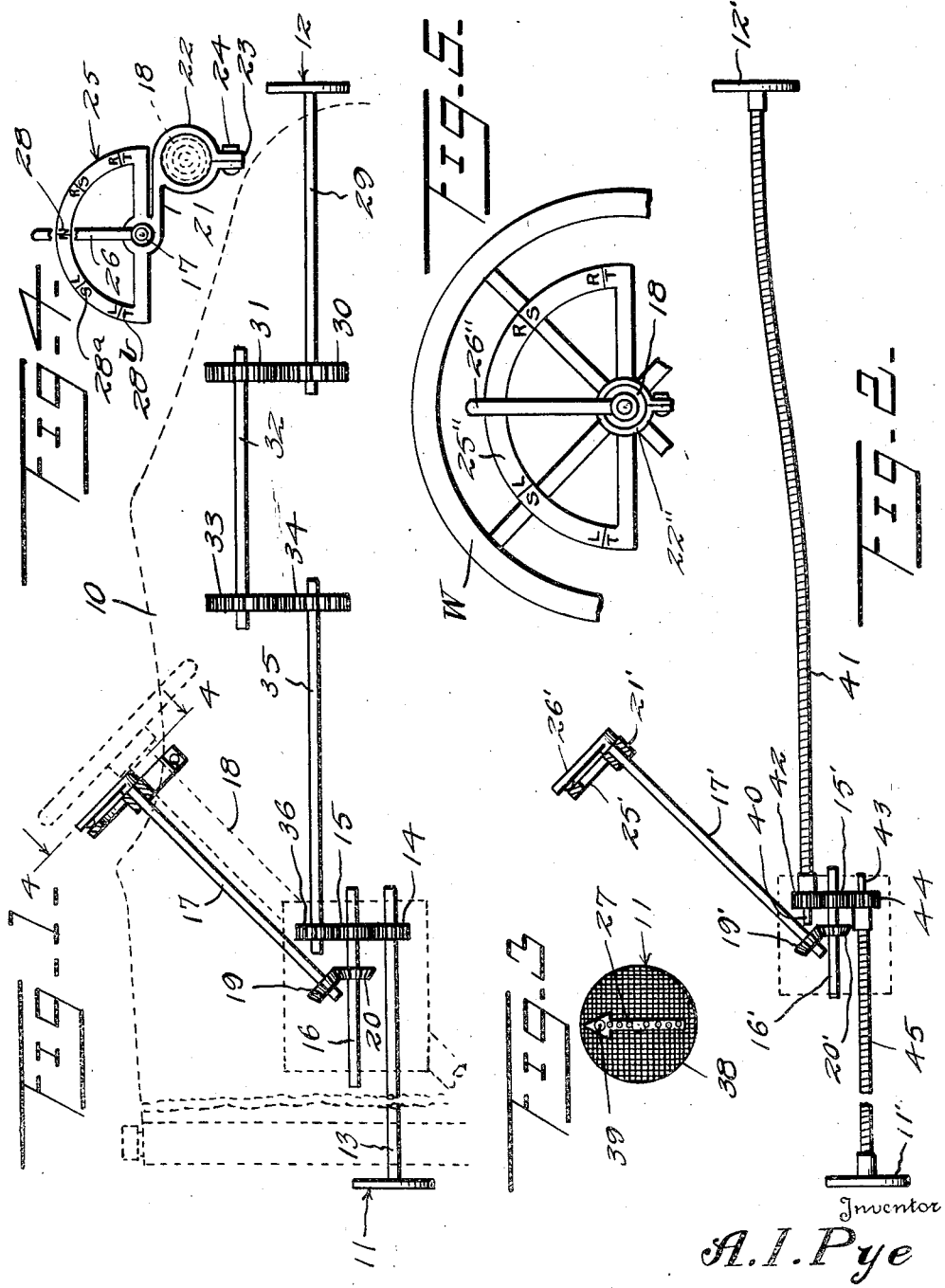
Oct. 20, 1936. A. I. PYE 2,058,176
AUTOMOBILE SIGNAL
Filed Aug. 30, 1934
Inventor
A. I. Pye
By Watson E. Coleman
Attorney Patented Oct. 20, 1936

UNITED STATES PATENT OFFICE 2,058,176

AUTOMOBILE SIGNAL

Andrew Ian Pye, Sparrows Point, Md.

Application August 30, 1934, Serial No. 742,195

1 Claim. (Cl. 116—47)

This invention relates to signalling devices and has for an important object thereof the provision of a manually operable signal means for signalling turning movements of the vehicle.

Another object of this invention is to provide a signalling means which is so constructed that it will not readily get out of order and will not act as a drain on the battery, while at the same time the device is so constructed that it can be readily seen at night by approaching vehicles.

A further object of this invention is to provide a signalling means of this kind which is so constructed that it can be mounted on any of the present types of motor vehicles or other types of conveyances, such as airplanes, locomotives, or other types of vehicles.

The above and various other objects and advantages of this invention will in part be described and in part be understood from the following detailed description of the present preferred embodiment, the same being illustrated in the accompanying drawing wherein:—

Figure 1 is a diagrammatic view of a signalling means constructed according to the preferred embodiment of this invention, mounted on a vehicle, which is shown in dotted lines.

Figure 2 is a modified form of this invention in diagrammatic view.

Figure 3 is a front elevation of one of the signalling members.

Figure 4 is a sectional view taken on the line 4—4 of Figure 1.

Figure 5 is a fragmentary plan view of the control mechanism mounted within the steering column of a vehicle.

Referring to the drawing wherein like numerals of reference designate corresponding parts throughout the several views, the numeral 10 designates generally a vehicle of suitable construction and size and this vehicle 10 is here shown as only one example of a vehicle on which the hereinafter described device may be mounted.

In order to provide a means whereby oncoming drivers may determine whether the driver of the vehicle 10 is about to make a turn, I have provided a signal member, generally designated as 11, which is mounted on the front portion of the vehicle 10 and a rear signal member 12 disposed at the rear of the vehicle. The signal member 11 is secured to a shaft 13, mounted for rotation in any suitable manner and this shaft 13 has a gear 14 fixed thereto meshing with a gear 15 mounted on a second shaft 16. The shaft 16 is rotated through the medium of a shaft 17 disposed in substantially parallel relation to the steering column 18 of the vehicle 10.

A beveled gear 19 is secured to the lower end of the shaft 17 which meshes with a beveled gear 20 mounted on the shaft 16. The upper portion of the shaft 17 is maintained in offset relation to the steering column 18 by means of a bracket arm 21 carried by a clamping member 22, engaging about the column 18. The clamping member 22 has a pair of ears 23 secured together by means of a tightening member 24. A quadrant or segmental member 25 is secured to the arm 21 and a lever 26 is secured to the upper end of the shaft 17 and swings across the face of the quadrant 25.

This lever 26 in its position relative to the quadrant 25 shows the angular relation of an arrow or indicating member 27 mounted on the front face of the disk 11. The quadrant 25 on the upper side has indications designated as 28, showing the definite angular positions of the arrow 27.

The rear disk or signalling member 12 is secured to a shaft 29 rotatably supported by the frame of the vehicle 10 and which is provided with a gear 30 adjacent the inner end thereof. This gear 30 meshes with a gear 31 mounted on a shaft 32 disposed in parallel relation to the shaft 29. The shaft 32 also has a gear 33 fixed thereto which meshes with a gear 34 carried by another shaft 35 positioned in parallel relation to the shaft 16.

The shaft 35 has a second gear 36 fixed thereto, meshing with the gear 15 secured to the shaft 16 adjacent the rear end thereof. The construction of the two signalling members 11 and 12 is similar and these members are constructed in the form of a flat disk-like member 38 having a relatively dark face, such as black or the like, and the arrow 27 is of a distinguishable color, such as white and may also be distinguished by reflecting beads or jewels 39. Through the medium of the jewels 39, it will not be necessary to light up the signalling members 11 and 12, as the lights of approaching vehicles will be reflected by the jewels and in this manner, the drivers of approaching vehicles will be able to tell what direction the driver of the vehicle 10 intends to take.

In Figure 2, there is disclosed a modified form of this invention where the shaft 17' is mounted at one side of the steering column in the same manner as the shaft 17 and is provided at its upper end with a lever 26' adapted to swing against the face of the quadrant 25' carried by the bracket arm 21'. The lower end of the shaft 17' has a beveled gear 19' secured thereto, meshing with a beveled gear 20' carried by a shaft 16'. The rear signal member 12' is secured to the rear end of a flexible shaft 40 mounted in a flexible housing 41.

The shaft 40 has a gear 42 secured thereto meshing with a gear 15' on the shaft 16'. A shaft 43 having a gear 44 meshing with the gear 15' extends toward the front of the vehicle. The shaft 43 is enclosed in a housing 45 and a front signal member 11' is mounted on the front end of the shaft 43.

I have not shown any housings or bearings for the various shafts shown in Figure 1, or the gears shown in Figure 2, but it will, of course, be understood that suitable housings may be provided and suitable bearings mounted on the frame or vehicle so that the shafts and gears will rotate as may be desired.

In the use and operation of the signalling means herein disclosed, when the driver of a vehicle 10 is moving in a straight line, the signal changing lever 26 will be substantially vertical or in the center of the quadrant 25. When the driver intends to turn out slightly to the left in order to pass a vehicle, the lever 26 is turned to the indication 28$^a$ on the left side of the quadrant 25. This indication 28$^a$ includes the letters L S, meaning left swerve, so that the driver of the vehicle 10 will know that the signal members 11 and 12 are turned only about 45°. In the event the driver of the vehicle 10 intends to make a left turn, the lever 26 is turned substantially 90° to the indication 28$^b$, and in the present instance L T, meaning left turn and the signal members 11 and 12 will then be substantially horizontal and pointed to the left.

As shown in Figure 5, the drive shaft 17 may be mounted in the center of the steering column and the quadrant 25'' may be positioned immediately above the steering wheel W so that the operating lever 26'' will be convenient to either hand of the driver. This latter mounting for the signal operating means is possible where a hollow steering shaft is used and where the usual throttle and spark control rods are not placed in the column.

It will also be understood that for certain types of vehicles, the disk 38 may be eliminated and only the jewelled arrow 27 used as a signal member. Furthermore, the rear signal member 12 may be distinguished from the front signal member 11 by having red jewels.

What is claimed is:—

A vehicle signal means comprising a pair of signal members, each member including light reflecting means, a vertically inclined drive shaft, means for securing said drive shaft in parallel relation to a vehicle steering column, a horizontally disposed stub shaft, a gear on the drive shaft, a gear on the stub shaft meshing with the gear on the drive shaft, a second gear secured to said stub shaft in spaced relation to said first stub shaft gear, a pair of signal operating shafts each connected at one end to a signal member, the opposite ends of said signal operating shafts being disposed on opposite sides of said stub shaft in parallel relation thereto, gears carried by the opposite ends of said signal operating shafts meshing with said second gear on said stub shaft, and an operating member fixed to said drive shaft.

ANDREW I. PYE.